(12) United States Patent
Leyba et al.

(10) Patent No.: US 6,276,502 B1
(45) Date of Patent: Aug. 21, 2001

(54) FLAT EXTENSION CORD

(76) Inventors: Martin Leyba, 4130 Cedar Ave., Long Beach, CA (US) 90807; Esther S. Lee, 25934 Matfield Dr., Torrance, CA (US) 90505

( * ) Notice: Subject to any disclaimer, the term of this patent is extended or adjusted under 35 U.S.C. 154(b) by 0 days.

(21) Appl. No.: 09/305,284

(22) Filed: May 5, 1999

Related U.S. Application Data

(60) Provisional application No. 60/084,330, filed on May 5, 1998.

(51) Int. Cl.[7] .................................................. H02G 11/02
(52) U.S. Cl. .................................. 191/12.2 R; 191/12.4; 191/12 R; 174/69; 174/117 F; 174/117 FF
(58) Field of Search .................................. 174/69, 117 F, 174/113 R; 191/12.2 R, 12.4, 12 R; 242/384.7

(56) References Cited

U.S. PATENT DOCUMENTS

| | | | |
|---|---|---|---|
| 1,061,642 | * 5/1913 | Stoup | 242/384.7 |
| 2,979,576 | * 4/1961 | Huber | 191/12.2 R |
| 3,208,121 | * 9/1965 | Price | 191/12.4 |
| 3,773,987 | * 11/1973 | Davis et al. | 191/12.4 |
| 4,201,278 | * 5/1980 | Balde | 191/12.4 |
| 4,202,510 | * 5/1980 | Stanish | 242/107.4 |
| 4,220,293 | * 9/1980 | Gename | 242/86.1 |
| 4,499,341 | * 2/1985 | Boyd | 191/12.4 |
| 4,743,711 | * 5/1988 | Hoffman | 174/109 |
| 4,757,955 | * 7/1988 | Simmons | 242/107.6 |
| 5,097,099 | * 3/1992 | Miller | 174/36 |
| 5,117,456 | * 5/1992 | Aurness et al. | 191/12.2 R |

* cited by examiner

Primary Examiner—S. Joseph Morano
Assistant Examiner—Frantz F. Jules
(74) Attorney, Agent, or Firm—Katten Muchin Zavis

(57) ABSTRACT

A flat extension cord that provides electrical power and/or digital data interconnectivity to a device. Preferably, the flat, retractable extension cord is rewindable into a housing much like a tape measure. The flat extension cord has a first end attached to a spool mechanism, a second end extending from the housing. The extension cord includes an elongate dielectric strip having a substantially concave cross-section which house a plurality of flexible electric conductors.

34 Claims, 10 Drawing Sheets

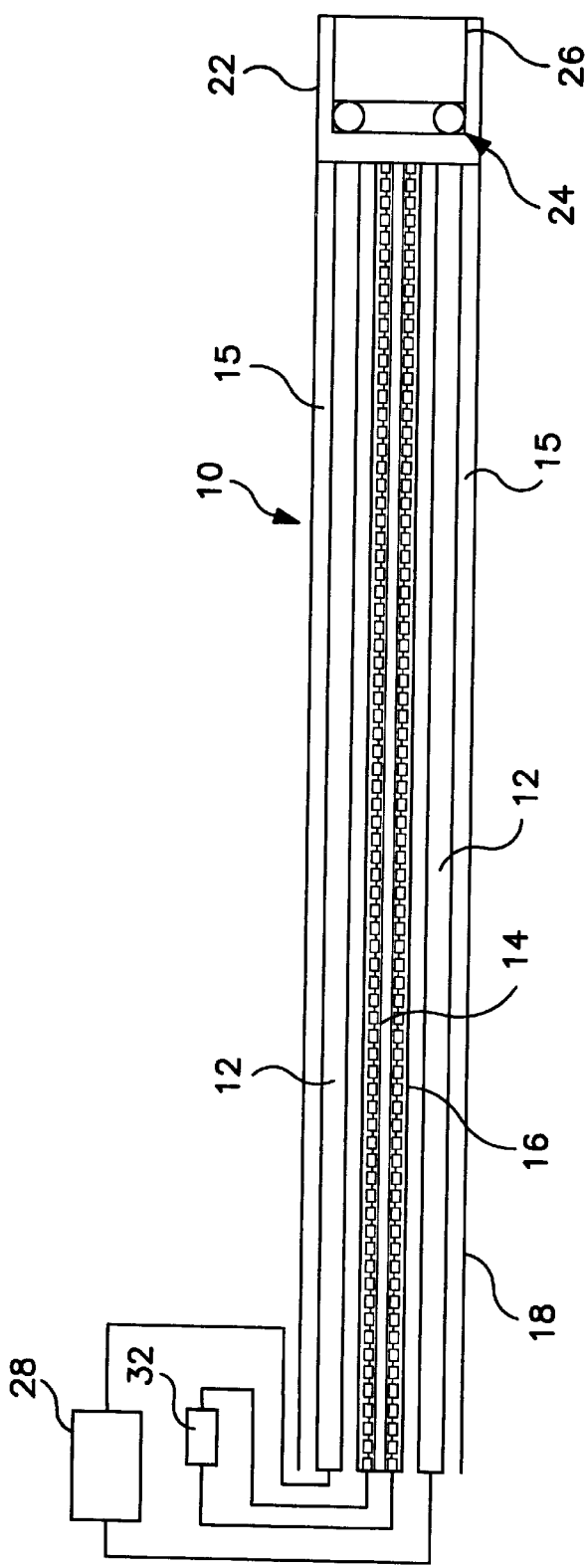
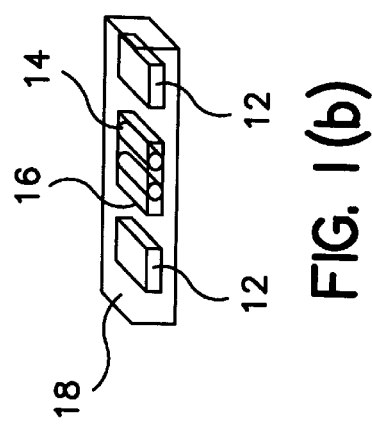
FIG. 1(a)
FIG. 1(b)

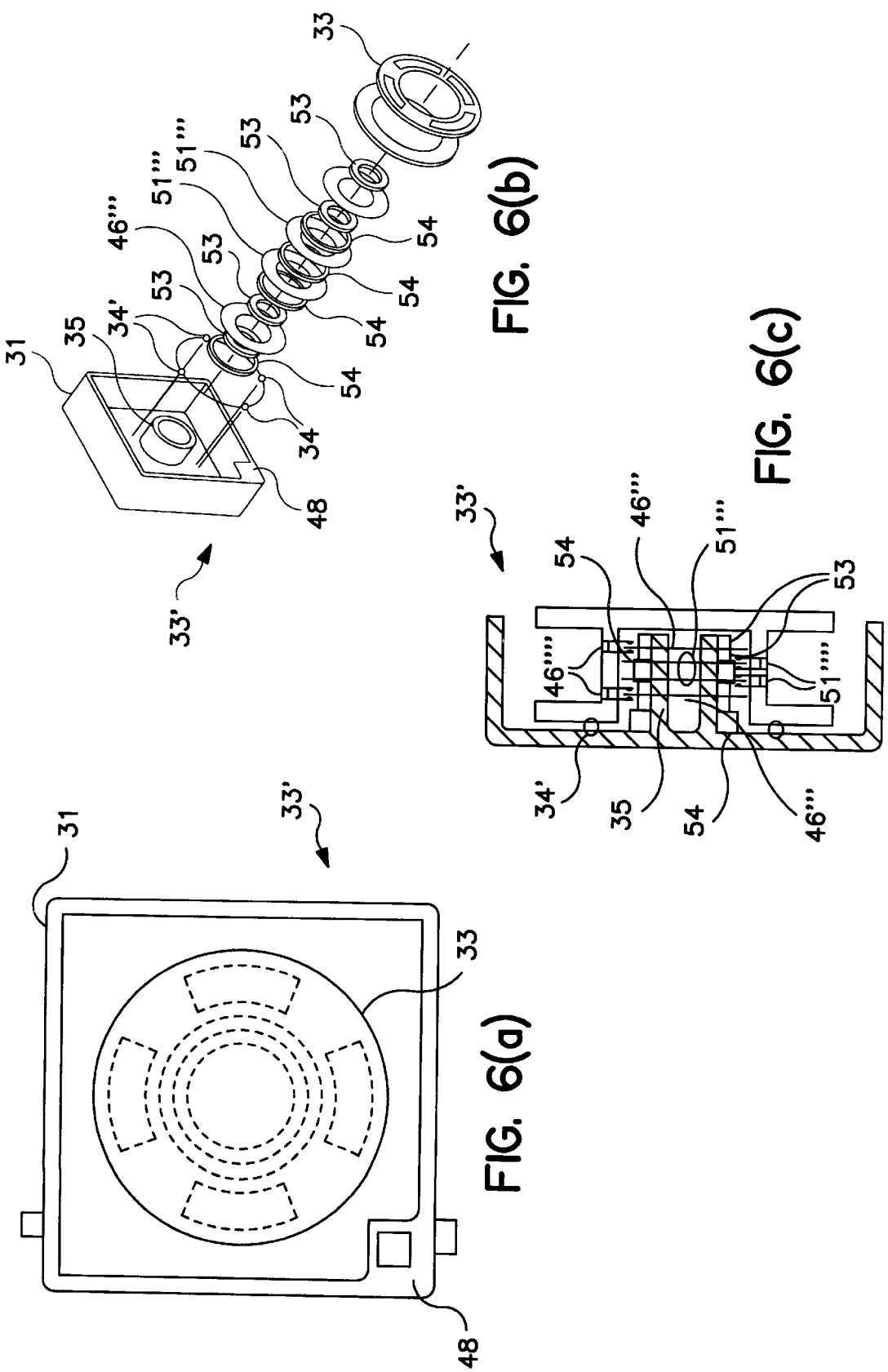

FLAT EXTENSION CORD

This application claims the benefit of U.S. Provisional Application No. 60/084,330, filed May 5, 1998.

BACKGROUND OF THE INVENTION

1. Field of the Invention

The present invention relates to a flat extension cord. More particularly, the invention relates to a flat extension cord that provides electrical power and/or signal communication interconnectivity in an easy-to-use, portable device that prevents snaggled wires and tripping. The invention further relates to a retractable extension cord that provides electrical power and/or signal communication interconnectivity to a device much like a tape measure. The invention also relates to a housing for a retractable extension cord where the housing utilizes rotary structure for extending or retracting the cord.

2. Description of Related Art

With the advent of remote access communication and portable computing devices, there is a need to provide reliable electrical power to these devices in a convenient fashion. Coupled with the need for reliable and convenient electrical power, is the need provide reliable and convenient data communication connections for these devices. The rising market for laptop computers alone attests to this need.

Commensurate with the need for reliable and convenient power and data communication connections, is the need for mobile and efficient peripheral devices such as printers and scanners. Mobile and efficient, in this sense, typically means small and light-weight. Additionally, there is a need to provide ergonomically designed devices that do not inhibit or interfere with users, or adversely affect the working environment.

Currently, when a laptop computer user wants to plug the computer into an electrical outlet and/or a data outlet (e.g., a network data port or a telephone jack), the user must run a power extension cord to the computer along with a separate data line cord. Because these cords may be bulky and loose, they can become entangled. The cords can also be a hazard to pedestrians who may trip over the cords, causing injury, or may pull the computer onto the floor, causing equipment damage. In a meeting where everyone brings a laptop, the resultant tangle of wires is downright hazardous.

Ergonomically designed extension cords are known in the art. For example, U.S. Pat. No. 4,780,994 discloses a flat extension cord for use under carpet. However, this device is not retractable into a housing and, because it is placed under the carpet, it is not readily portable. Additionally, this device does not include data transmission lines.

U.S. Pat. No. 5,590,749 ('749 patent) and 5,701,981 ('981 patent) disclose retractable cords and housings. The '749 patent discloses a spring-biased, retractable reel within a housing, wherein an electrical cord is wound around the reel. The '981 patent also discloses a spring-biased, retractable reel within a housing, wherein an electrical cord is wound around the reel. However, neither of these patents discloses a multi-functional, substantially flat extension cord for providing both power and data transmission to a device.

Thus, there is a need to provide a mobile, light-weight device that can connect portable communication and computing devices to an electrical power source and/or a data communication source. The device should allow a variable length of cord to be utilized to prevent a personnel or equipment hazard. The device also should be robust enough to withstand frequent and numerous "plugging" and "unplugging" events, and the handling and displacement associated with transportation.

SUMMARY OF THE INVENTION

It is therefore a principal object of the present invention to provide a flat extension cord that can connect portable communication and/or computing devices to respective electrical power and data communication sources.

Another object of the present invention is to provide a retractable extension cord that can simultaneously connect portable communication and computing devices to both an electrical power source and a data communication source, and which can be retracted into a portable housing.

Yet another object of the present invention is to provide a housing for a retractable extension cord.

In one aspect of the present invention a flat extension cord includes a thin, elongate dielectric strip. A plurality of flexible electrical power conductors extend lengthwise within the strip. Additionally, a plurality of flexible data transmission conductors, electrically insulated from the electrical power conductors, extend lengthwise within said strip. A first connector is electrically connected to the plurality of electrical power conductors and the plurality of data transmission conductors at a first end of the strip. A second connector is electrically connected to the plurality of electrical power conductors at a second end of the strip. A third connector is electrically connected to the plurality of data transmission conductors at the second end of said strip. Preferably, the strip is stiff so that it lays flat on the floor, preventing tripping.

In another aspect of the present invention, a retractable, flat electrical cable includes a concave, longitudinally-extending support member, and at least one electrical conductor coupled to the support member. A housing, and a rewinder coupled to the housing which rewinds the support member and the conductor into the housing. The concave support member preferably biases the cord to add longitudinal stiffness, allowing the cord to be flat, be easily moved, and be easily extended and retracted.

In a further aspect of the present invention, a retractable extension cord includes a housing, and a spool mechanism rotatably mounted within the housing, and a flat extension cord having a first end attached to the spool mechanism and a second end extending from a first opening in the housing. The extension cord includes an elongate dielectric strip, a plurality of flexible electrical power conductors extending lengthwise within the strip, a plurality of flexible data transmission conductors electrically insulated from the electrical power conductors and extending lengthwise within the strip, and a first connector electrically connected to the plurality of electrical power conductors and the plurality of data transmission conductors at a second end of the extension cord. A second connector is mounted to an external surface of the housing and is electrically connected to the plurality of electrical power conductors at the first end of the extension cord. Additionally, a third connector is mounted in a second opening of the housing and is electrically connected to the plurality of data transmission conductors at the first end of the extension cord.

In still a further aspect of the present invention, a retractable extension cord includes a housing, a spool mechanism rotatably mounted within the housing, and a flat extension cord having a first end attached to the spool mechanism and a second end extending from a first opening in the housing. The extension cord includes an elongate dielectric strip, a plurality of flexible electrical power conductors extending lengthwise within the strip, a plurality of flexible data transmission conductors electrically insulated from the electrical power conductors and extending lengthwise within the strip, and a first connector electrically connected to the plurality of electrical power conductors and the plurality of data transmission conductors at a second end of the extension cord. A second connector is pivotally mounted to an external surface of the housing and is electrically connected to the plurality of electrical power conductors at the first end of the extension cord. A third connector mounted in a second opening of the housing is electrically connected to the plurality of data transmission conductors at the first end of the extension cord.

In an additional aspect of the present invention, a housing for a retractable extension cord includes a hollow casing having a removable cover plate and an opening through which the retractable extension cord extends. A reel mechanism is rotatably mounted within the hollow casing, and a rewinder is coupled to the reel mechanism. A bracket is pivotally mounted to at least one external surface of the hollow casing.

In still an additional aspect of the present invention, a housing for a retractable extension cord includes a hollow casing having a removable cover plate and a first opening through which the retractable extension cord extends. A spool is rotatably mounted within the housing, and a rewinder is attached to the spool. A bracket is pivotally mounted to at least one external surface of the hollow casing, and the bracket has a multi-prong electric plug attached thereto. A second opening in the hollow casing is so dimensioned as to receive electrical conductors extending from the multi-prong plug into the hollow casing. A third opening in the hollow casing is so dimensioned as to receive a telephone line connector. A button is attached to an external surface of the hollow casing and extends longitudinally toward a hub of the spool, such that depressing the button toward the hub substantially inhibits the spool from rotating.

In yet another aspect of the present invention, a retractable extension cord includes a hollow housing, a spool mechanism rotatably mounted within the housing, a rewinder attached to the spool mechanism, and a flat extension cord having a first end attached to the spool mechanism and a second end extending from a first opening in the housing. The extension cord includes an elongate dielectric strip, a plurality of flexible electrical power conductors extending lengthwise within the strip, a plurality of flexible data transmission conductors electrically insulated from the electrical power conductors and extending lengthwise within the strip, and a first connector electrically connected to the plurality of electrical power conductors and the plurality of data transmission conductors at a second end of the extension cord. A circuit protection mechanism is mounted within the housing and is electrically connected to at least one of the plurality of electrical power conductors at the first end of the extension cord. A multi-prong plug is rotatably mounted to an external surface of the housing and is electrically connected to the circuit protection mechanism and at least one of the plurality of power conductors at the first end of the extension cord. A female telephone jack is mounted in a second opening of the housing and electrically connected to the plurality of data transmission conductors at the first end of the extension cord.

In yet an additional aspect of the present invention, a retractable extension cord includes a hollow housing, a spool mechanism rotatably mounted within the housing, a rewind mechanism coupled to the spool mechanism, and a flat extension cord having a first end attached to a hub of the spool and a second end extending from a first opening in the housing. The extension cord includes an elongate dielectric strip, a plurality of flexible electrical power conductors extending lengthwise within the strip, a plurality of flexible data transmission conductors electrically insulated from the electrical power conductors and extending lengthwise within the strip, and a first connector electrically connected to the plurality of electrical power conductors and the plurality of data transmission conductors at a second end of the extension cord. A bracket is rotatably mounted to an external surface of the housing. A multi-prong plug is mounted to an external surface of the bracket and is electrically connected to the plurality of electrical power conductors. A female telephone jack is mounted in a second opening of the housing and is electrically connected to the plurality of data transmission conductors at the first end of the extension cord.

In yet still a further aspect of the present invention, a retractable extension cord includes a hollow casing having a removable cover plate and a first opening through which the retractable extension cord extends. A reel is rotatably mounted within the hollow casing, and a rewinder is attached to the reel. A flat extension cord has a first end attached to the hub and a second end extending from a first opening in the hollow casing. The extension cord includes an elongate dielectric strip, a plurality of flexible electrical power conductors extending lengthwise within the strip, a plurality of flexible data transmission conductors electrically insulated from the electrical power conductors and extending lengthwise within the strip, and a first connector electrically connected to the plurality of electrical power conductors and the plurality of data transmission conductors at a second end of the extension cord. A circuit protection mechanism is mounted within the hollow casing and is electrically connected to at least one of the plurality of electrical power conductors at the first end of the extension cord. A bracket is rotatably mounted to at least one external surface of the hollow casing. A multi-prong plug is mounted to an external surface of the bracket and is electrically connected to the plurality of electrical power conductors at the first end of the extension cord, the prongs of the multi-prong plug being pivotally mounted thereto. A female data transmission connector is mounted in a second opening of the hollow casing and is electrically connected to the plurality of data transmission conductors at the first end of the extension cord. A button is mounted in a third opening of the hollow casing and extends longitudinally toward a hub of the reel, wherein depressing the button toward the hub substantially inhibits the reel from rotating.

These and other objects, aspects, advantages and features of the present invention will become more apparent to those skilled in the art when the following detailed description is read in conjunction with the accompanying drawings.

DETAILED DESCRIPTION OF THE DRAWINGS

FIGS. 1(a) and 1(b) depict top and cross-section views, respectively, of an extension cord of the present invention.

FIGS. 2(a)–2(c) depict perspective, front, and rear views of a dual connector of the present invention.

FIGS. 3(a)–3(f) depict cross-sectional views of an extension cord of various embodiments of the present invention.

Figure 5A:
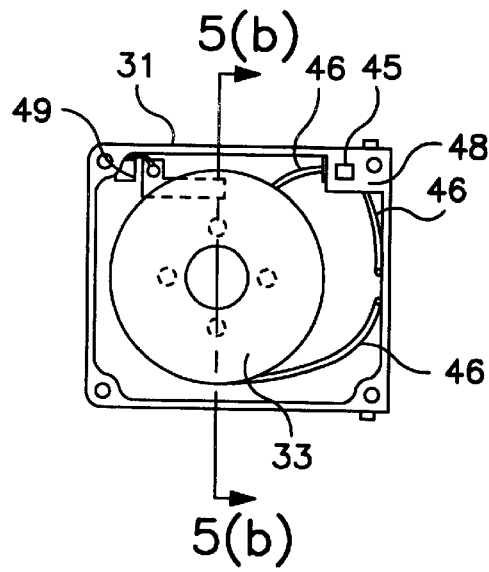
Figure 5B:
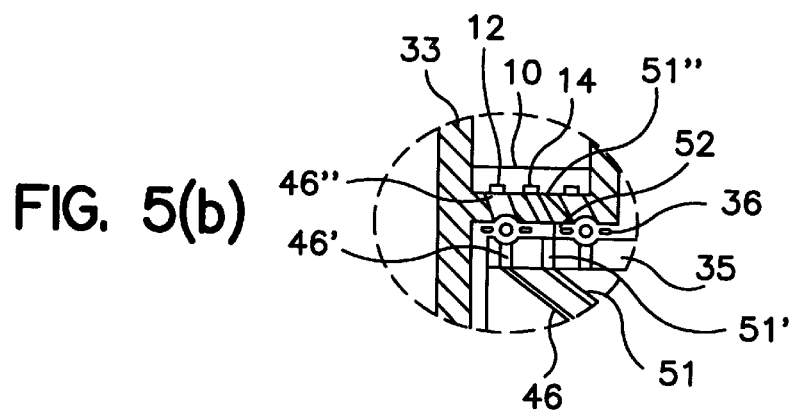
Figure 5C:
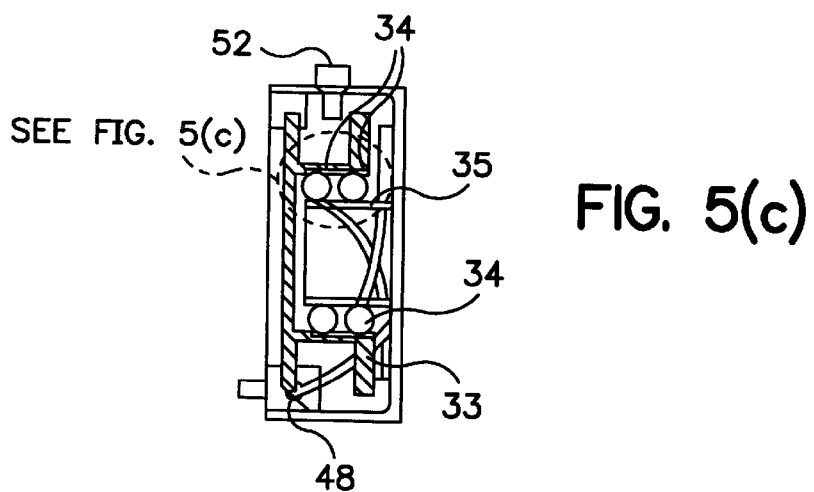

FIGS. 5(a)–5(c) depict the connections of internal wiring to the extension cord according to a first embodiment of the present invention.

FIGS. 6(a)–6(c) depict the connections of internal wiring to the extension cord according to a second embodiment of the present invention.

Figure 7A:
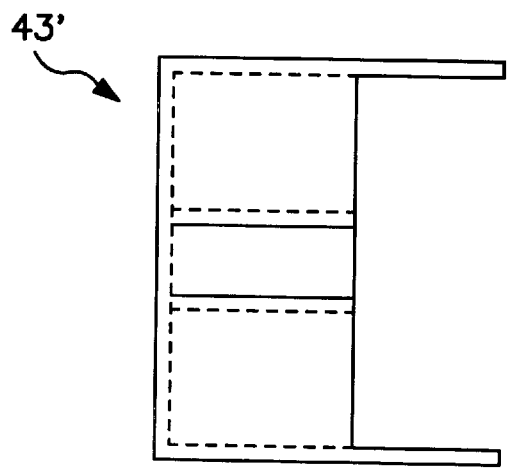
Figure 7B:
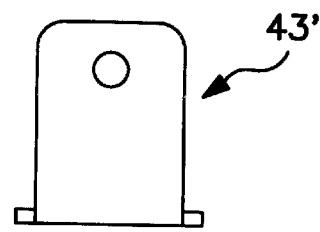
Figure 7C:
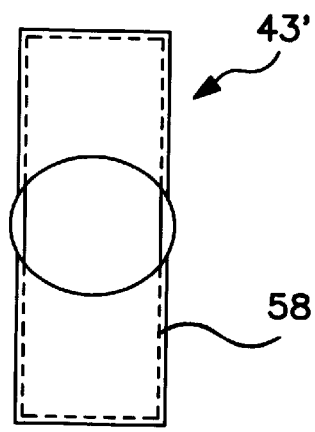

FIGS. 7(a)–7(c) depict side, top, and front views, respectively, of a transformer bracket according to an alternative embodiment of the present invention.

Figure 8A:
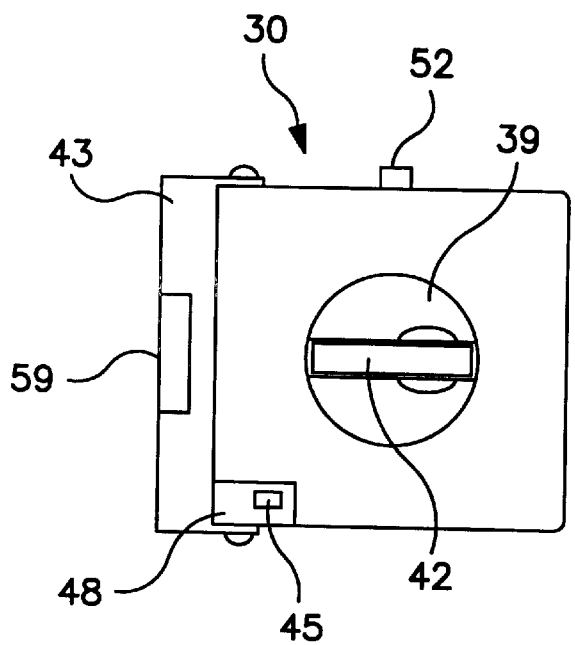
Figure 8B:
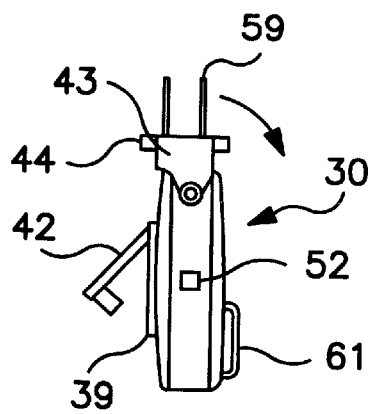
Figure 8C:
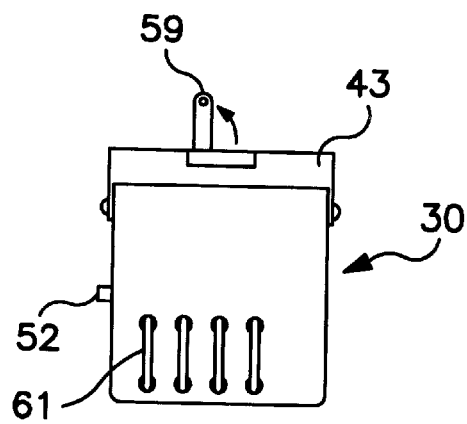

FIGS. 8(a)–8(c) provide front, end, and rear views, respectively, of an assembled housing of the present invention.

Figure 9:
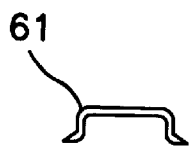

FIG. 9 illustrates an anchor device of the present invention.

Figure 10:
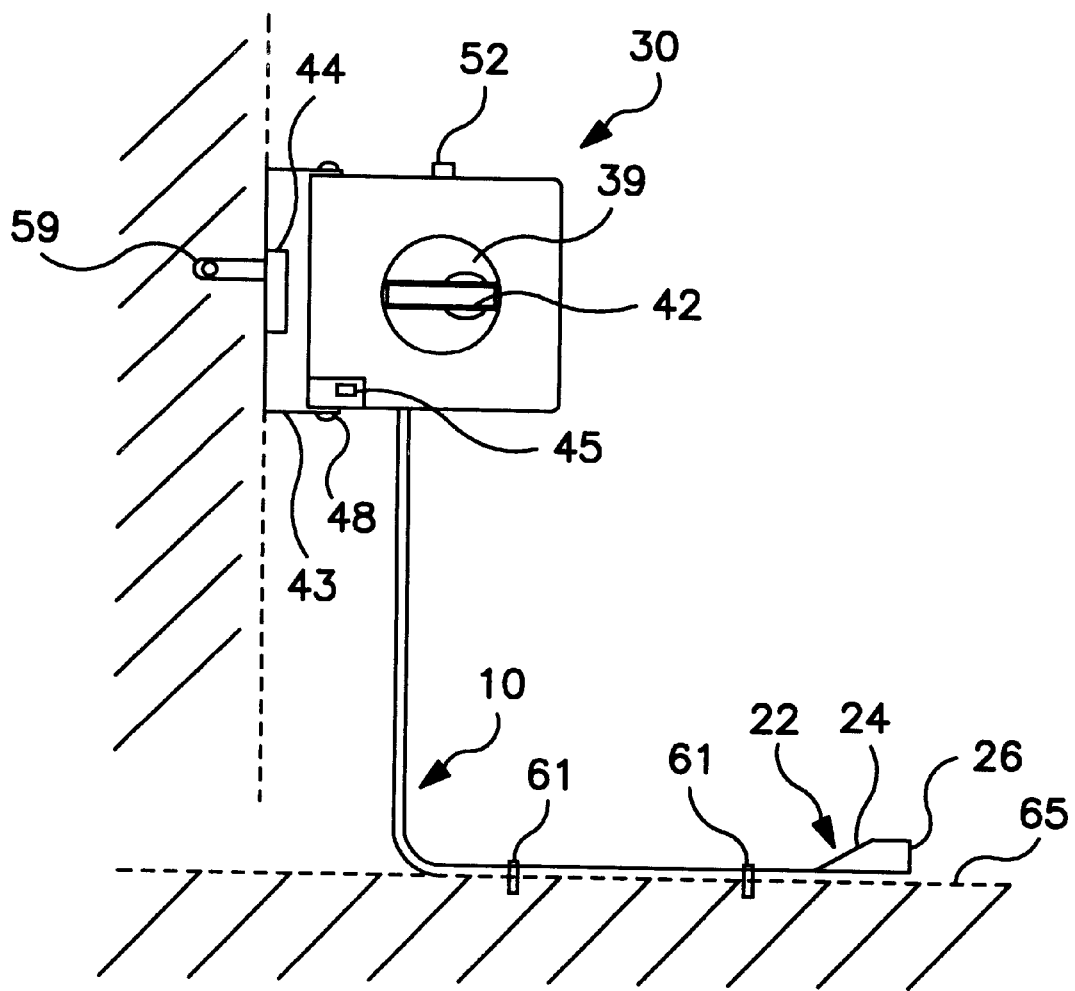

FIG. 10 depicts a typical use setting of the present invention.

Figure 11:
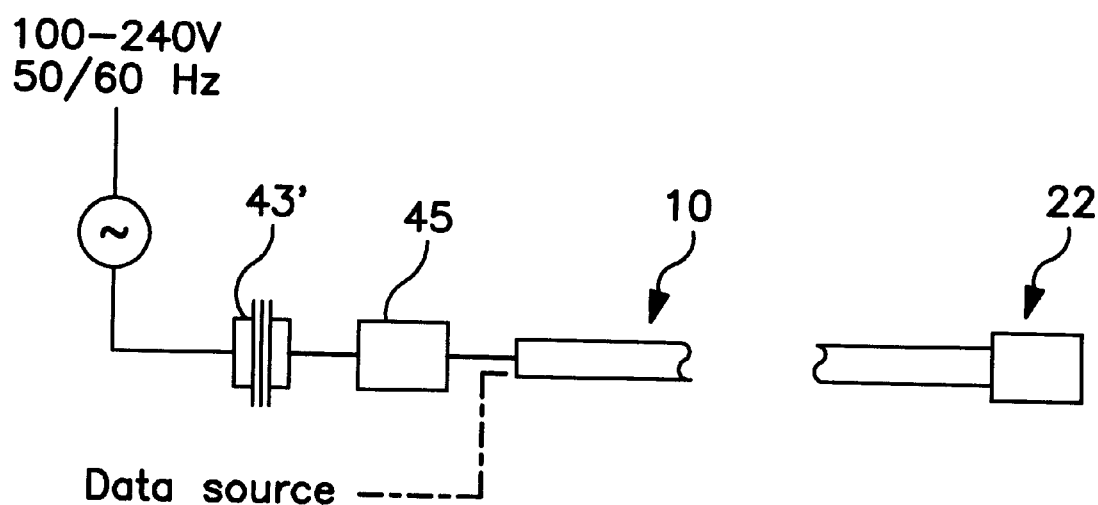

FIG. 11 is a functional schematic diagram of the present invention.

DETAILED DESCRIPTION OF THE PREFERRED EMBODIMENTS

FIGS. 1(a) and 1(b) depict a top view and section view, respectively, of the extension cord according to a first embodiment of the present invention. The cord 10 includes a plurality of power conductors 12 and data transmission conductors 14. Shielding 16 surrounds the data transmission conductors to inhibit interaction with the power signals on power conductors 12, and inhibit noise from external sources. Shielding 16 can be any type of shielding material known to an ordinarily skilled artisan. For example, shielding 16 could be metal foil, mesh, ribbon, etc., but in the preferred embodiment is copper foil. The power 12 and data transmission 14 conductors are encased in a dielectric insulation material 18. This material can be any transparent or opaque flexible dielectric insulator known to an ordinarily skilled artisan. For example, insulator 18 could be teflon, plastic, rubber, etc., but in the preferred embodiment is transparent Kapton.

Insulator 18 is preferably transparent to enhance visibility of cord 10. A transparent insulation allows the user and pedestrians to see cord 10 when extended if various colored conductors are used. Alternatively, a small light source could be included and flexible optical fibers 15 could extend within cord 10. This arrangement would also enhance the cord's visibility. In another arrangement, various design patterns could be included to enhance visibility. Examples of various design patterns include cross hatches, a railroad crossing-type design, or coloring variations. Additionally, a fluorescent material could be coated on the surface of cord 10. The ordinarily skilled artisan will, of course, realize that these examples are not limiting and that many of these examples could be implemented with either transparent or opaque insulation.

The insulator 18 preferably has substantial "stiffness" due to its shape and/or material. Stiffness is advantageous since the cord should lay flat on the floor and resist being overturned or set on edge. These stiffness features are similar to the well-known tape measure which is made of a thin metal and formed in a concave shape. Similarly, in the present invention, the insulator 18 should be made of a stiff dielectric material that will be flat year easy roll up into a winder housing. Alternatively, the insulator could be a soft plastic affixed to a stiff substrate such as a thin concave metal strip. The dimensions of the insulator 18 should also provide the required stiffness. For example, a cord with both power and data cables may be 1 inch wide by ¼ inch thick, although cables as wide as 3 inches and as thick as 1 inch may be used. Even layer cords may be provided for multiple-user configurations.

A dual purpose connector 22 is connected at one end of the flexible extension cord 10. This dual purpose connector includes both a female electrical power connector 24 and a female data connector 26. Two additional connectors can be provided at the opposite end of flexible extension cord 10. One connector is an electrical power connector 28, for connecting the cord to an electrical power source. The other connector is a data connector 32 for connecting the cord to a data source. Connectors 28 and 32 can be separate connectors or, like connector 22, can be integrally formed. Connectors 28 and 32 can be either male or female connectors, depending upon the specified end use, and can be any type known in the art for connecting electrical conductors to electrical and data sources. For example, connector 28 could be a conventional, three-prong, or two-prong, male AC plug connector. Connector 32 can be, for example, a conventional RJ11 telephone jack or plug. These devices are, of course, not limited to these embodiments.

Figure 2A:
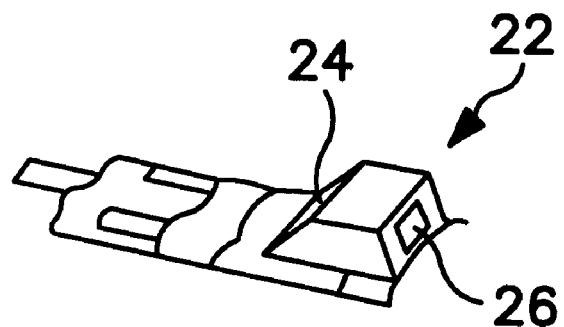
Figure 2B:
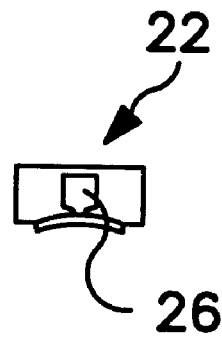
Figure 2C:
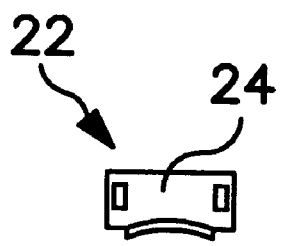
Figure 3A:
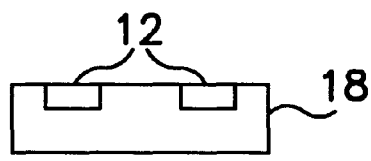
Figure 3B:
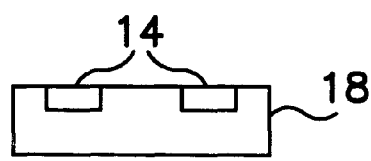
Figure 3C:
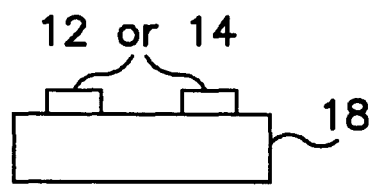
Figure 3D:
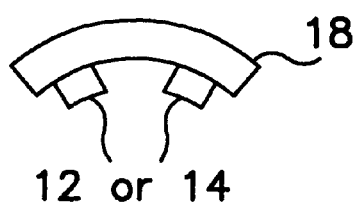
Figure 3E:
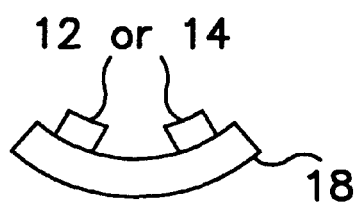
Figure 3F:
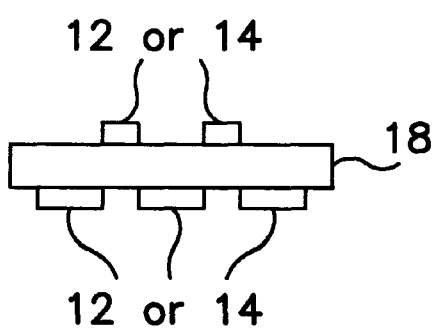

FIGS. 2(a)–2(c) depict perspective, front, and rear views of dual connector 22, respectively. As shown in these Figures, female electrical power connector 24 includes slots for a multi-prong plug. These slots could be any number necessary for the electrical configuration of the device being used, but in the preferred embodiment is a dual-slot device. Data connector 26 can also be any type known in the art, but in the preferred embodiment is designed to fit a male RJ11 telephone plug connector. Since connectors 24 and 26 are on opposite sides of the housing, connections can be quickly and easily made.

FIGS. 3(a)–3(f) depict cross-section views of cord 10 according to various embodiments. As depicted in these Figures, cord 10 can include any number of power conductors 12 and data transmission conductors 14, depending upon the user's need. The conductors could be fully embedded within insulator 18, in which case cord 10 would have a smooth contour. Alternatively, conductors 12 and 14 could protrude (while still being covered with electrical insulation) from the top surface of 18, the bottom surface of insulator 18, or any variation thereof. In the preferred embodiment, both conductors 12 and 14 are fully embedded within insulator 18. Additionally, the cross-section of cord 10 could take on various shapes. Non-limiting examples include or cross-sections for cord 10 include a square cross-section, a rectangular cross-section, a concave cross-section, or a convex cross-section. In a preferred embodiment, however, cord 10 has a concave cross-section to provide enhanced stability when extended.

Figure 4A:
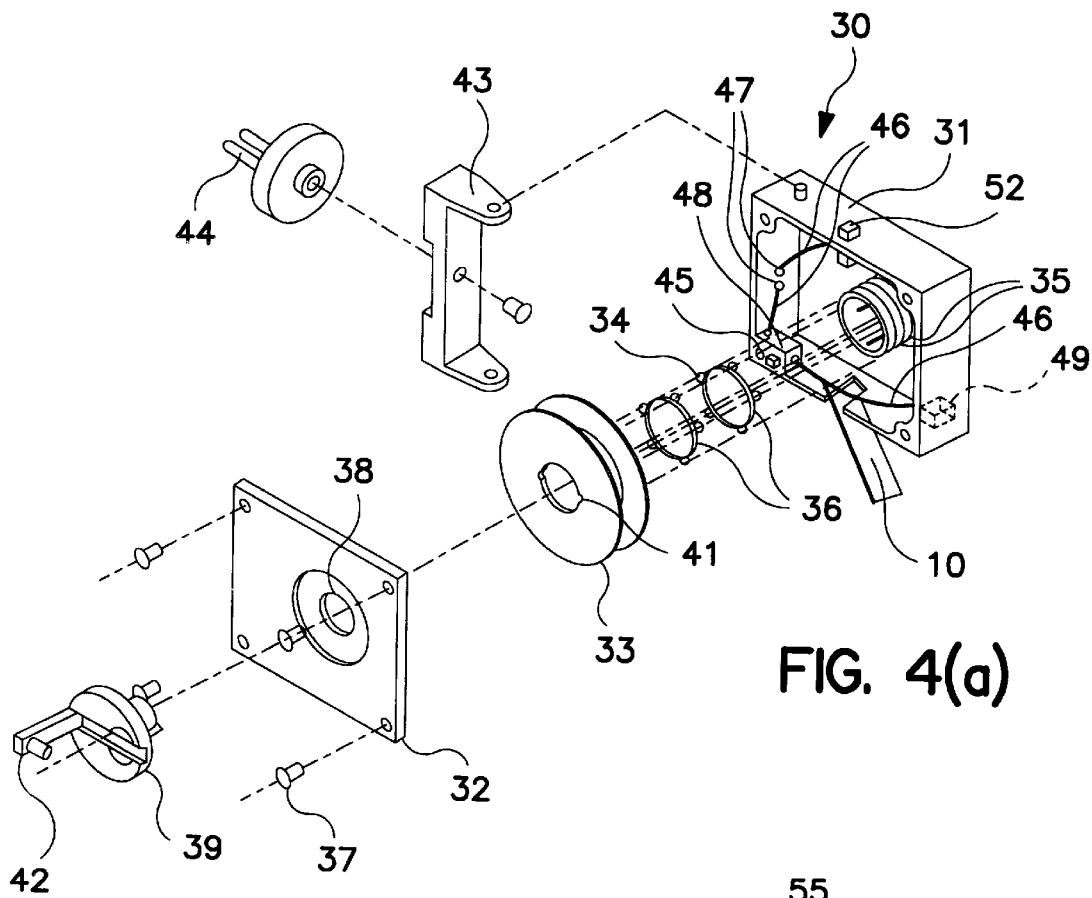
FIG. 4(a) is an exploded view of the retractable extension cord housing of a first embodiment of the present invention.
Figure 4B:
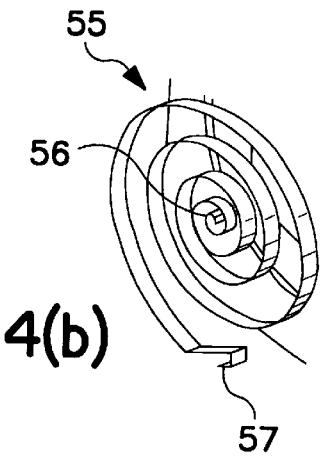
FIG. 4(b) is a perspective view of a rewind mechanism of an alternative embodiment of the present invention.

To provide transportability and ease of use, flexible extension cord 10 is preferably mounted within a housing that allows extension from the housing to a desired length, and retraction back into the housing. In this configuration, the power and data sources are provided to extension cord 10 using connectors provided with the housing. Referring now to FIGS. 4(a) and 4(b), a description of such a housing will now be provided.

Housing 30 comprises a casing 31 which, together with a removable cover plate 32, retains the cord unwind/rewind mechanisms internally. Casing 31 and cover plate 32 can be formed of any suitable material, such as plastic, metal, or fiberglass, but in the preferred embodiment are molded plastic. Housed within casing 31 is cable spool or reel mechanism 33. Mechanism 33 rotates, on bearings 34, around support 35, which can be formed integrally with casing 31 or be manufactured as a separate part. Support 35 includes conductor bearing races 36, upon which bearings 34 rest.

The above described components are maintained within housing 30 by cover plate 32. Cover plate 32 is preferably removable, but can be attached to casing 31 using any know means, such as adhesive, rivets, or nails, but preferably using screws 37. Cover plate 32 can include an opening 38. This opening accommodates attachment of a handle 39. Handle 39 attaches to the hub of mechanism 33 and is used to manually retract cord 10 around mechanism 33. This attachment can be by any method known to the ordinarily skilled artisan, but in the preferred embodiment is attached via detents 41 within mechanism 33 hub. Handle 39 includes a pivotally retractable operator 42. Operator 42 pivots approximately 180° about an axis, which allows operator 42 to lie substantially flush against housing 30 for storage, and to be extended outwardly for ease of rotating mechanism 33.

Pivotally attached to one or more external surfaces of casing 31 is a bracket 43. Bracket 43 pivots approximately 180° as well. Attached to bracket 43 is a multi-prong power connector 44. Connector 44 can be any known connector for attachment to power source, but in the preferred embodiment is a male, multi-prong AC plug, wherein the prongs are pivotally mounted (discussed further below). Connector 44 is electrically connected to cord 10 and a circuit protection device 45 via wiring 46, extending through openings 47. Circuit protection device 45 is housed within circuit protection housing 48 and protects the cord and attached peripherals from an over-power condition. Circuit protection device 45 could be any circuit protection mechanism known to an ordinarily skilled artisan, such as a resettable circuit breaker switch, but in the preferred embodiment is a pop-out fuse.

A data source connection 49 is also provided in casing 31. Data source connection may be any type known in the art, but in the preferred embodiment is an RJ11 telephone jack. Data source connector 49 is also electrically connected to cord 10 via wiring 51 (see FIG. 5(c)).

Also extending through casing 31 is lock button 52. Lock button 52 will prevent further extension of cord 10 when pressed against the unwound portion of cord 10. Thus, the amount of cord 10 extracted from housing 30 will not change. Lock button 52 may be any type known to the ordinarily skilled artisan. Non-limiting examples include a spring-release type switch, or a simple friction fit switch which fits through an opening in casing 31.

FIG. 4(b) depicts an alternative mechanism for rewinding cord 10 back into housing 30 in an alternative embodiment. According to this embodiment, rather than providing handle 39, a rewind spring 55 is used. Spring 55 can attach to a central portion of mechanism 33 via inner portion 56, and to a portion of either casing 31 or removable cover plate 32, via outer portion 57. Thus, as cord 10 is retracted, spring 55 places mechanism 33 under tension, urging it to rewind. When a desired length of cord 10 has be extended from housing 30, lock button 52 is depressed to maintain this amount of extension. When the user desires to retract cord 10, lock button 52 need only be released and cord 10 will automatically retract under the tension of spring 55.

Referring now to FIGS. 5(a)–5(c), the connection of internal wiring 46, 51 to cord 10 will now be discussed. FIG. 5(a) depicts a side view of housing 30 with cover 32 removed. Shown in this Figure are casing 31, mechanism 33, circuit protection device 45 and housing 48, wiring 46 and data source connection 49. FIG. 5(b), which is a cross-section along lines Z—Z of FIG. 5(a), shows mechanism 33, conductive bearings 34, support 35, and lock button 52. As shown, lock button 52 extends toward the hub of mechanism 33, and when depressed prohibits movement of the cord into or out of the housing 30. FIG. 5(c), which is an exploded portion of FIG. 5(b), depicts how internal wiring 46 and 51 connects to cord 10. As shown, internal wiring 46 and 51 are connected to conductive elements 46' and 51' within support 35. In electrical contact with elements 46', and placed within bearing races 36, are conductive bearings 34. Conductive bearings 34 are also in electrical contact with conductive elements 46'' within the hub of mechanism 33. Electrically connected to elements 46'' are power conductors 12 of cord 10. Conductive elements 51' are electrically connected to conductive elements 51'' within the hub of mechanism 33 via spring contacts 52. Conductive elements 51'' are electrically connected to data transmission conductors 14 of cord 10.

FIGS. 6(a)–6(c) depict an alternative mechanism 33' support and connection arrangement. FIG. 6(a) shows a side view of the alternative embodiment with cover plate 32 removed. FIG. 6(b) depicts the arrangement of the internal components for this alternative embodiment. As shown, casing 31 includes support 35 and circuit protection housing 48. However, rather than conductive bearings riding within races of support 35, bearings 34' rest against a wall of casing 31 and provide rotational support for mechanism 33. Placed around support 35 are the devices for providing electrical connection to cord 10. These devices include dielectric spacers 53 and 54, and conductive spacers 46''' and 51'''. As depicted in FIG. 6(c), dielectric spacers 53 and 54 hold, and separate, conductive spacers (copper or brass) 46''' and 51''' around support 35. Within mechanism 33'' are sets of electrical contacts (beryllium types) 46'''' and 51'''' which are, respectively, in electrical contact with conductive spacers 46''' and 51'''. Internal wiring 46 and 51 are electrically connected, respectively, to conductive spacers 46''' and 51''', respectively. Conductive spacers 46''' and 51''' are in turn electrically connected to contacts 46'''' and 51'''', respectively, which are in turn, respectively, connected to power conductors 12 and data transmission conductors 14 or cord 10.

FIGS. 7(a)–7(c) an alternative embodiment for bracket 43. In this alternative embodiment, bracket 43' includes an internal transformer 58. Transformer 58 can be any type of small transformer known to an ordinarily skilled artisan, and can be used to step the incoming voltage up or down.

Turning now to FIGS. 8(a)–8(c), illustrated is the front, end, and rear view, respectively, of an assembled housing 30 according to the present invention. As shown in FIGS. 8(a) and 8(c), the prongs 59 of connector 44 are pivotally mounted within connector 44. FIG. 8(a) depicts prongs 59 pivoted to the point where they are substantially flush against bracket 43. Also depicted in FIGS. 8(b) and 8(c) are anchor devices 61. Anchor devices 61 snap into housing 30 and when removed are used to anchor cord 10 to the surface along which it is running, for example to the carpeting of a room. An end view of an anchor device 61 is shown in FIG. 9. These devices may be formed of any material known to the ordinarily skilled artisan, for example, plastic or metal. In the preferred embodiment, anchors 61 are formed of ABS plaster.

FIG. 10 depicts the retractable cord 10 and housing 30 in a typical use setting. Prongs 59 are fully extended and inserted into an AC wall plug (not shown). Depending upon the magnitude of the voltage, housing 30 may include alternative bracket 43' to step the voltage to the appropriate level. Cord 10 extends outwardly from housing 30 toward the floor 65. Anchors 61 are shown anchoring cord 10 to the floor 65. Because bracket 43 (or 43') is pivotally mounted to casing 31, housing 30 can be rotated to place it substantially flush against the wall. This also provides a safeguard against persons accidentally bumping into the housing while it is plugged into the wall. Once the housing 30 and cord 10 are in place, communications or computing devices can be plugged into either power connector 24, data connector 26, or both.

A functional schematic diagram of cord 10 and housing 30 is depicted in FIG. 11. Depending upon the user's location, the AC power source can vary, as depicted, between 100–240 VAC at a frequency of 50–60 Hz. Thus, a user may or may not need optional transformer bracket 43'. While this Figure depicts transformer 43'being used, this is clearly not limiting. The AC power then runs through circuit protection device 45, through power conductors 12 (not shown) in cord 10, to power connector 24 (not shown) within dual connector 22. A data source can also be connected to data source connector 49 (not shown). The data signal runs through conductors 51 (not shown), data conductors 14 (not shown) in cord 10, to data connector 26 (not shown) within dual connector 22.

While preferred embodiments of the present invention have been illustrated in detail, it is apparent that modifications and adaptations of the preferred embodiments will occur to those skilled in the art. For example, the power and/or data source connections may be made at the retractable end of the cord, while the rewind housing has multiple power and data connections for user connections. It will be expressly understood that such modifications and adaptations are within the spirit and scope of the present invention as set forth in the following claims.

We claim:

1. A retractable, flat electrical cable, comprising:
   a concave, longitudinally-extending support member;
   at least one electrical conductor coupled to said support member;
   a housing; and
   a rewinder coupled to said housing which rewinds said support member and said conductor into said housing.

2. The cable of claim 1, wherein said rewinder comprises a manual operator.

3. The cable of claim 2, wherein said manual operator further comprises a pivotally mounted handle.

4. The cable of claim 2, wherein said rewinder comprises a spring mechanism.

5. The cable of claim 1, further comprising:
   a connector electrically connected to said at least one conductor at an end of said support member.

6. The cable of claim 5, wherein said connector comprises an electrical power connector and a data connector.

7. A retractable extension cord comprising:
   a housing;
   a spool mechanism rotatably mounted within said housing;
   a flat extension cord having a first end attached to said spool mechanism and a second end extending from a first opening in said housing, said extension cord comprising an elongate dielectric strip having a substantially concave cross-section, a plurality of flexible electrical power conductors extending lengthwise within said strip, a plurality of flexible data conductors electrically insulated from said electrical power conductors and extending lengthwise within said strip, and a first connector electrically connected to said plurality of electrical power conductors and said plurality of data transmission conductors at a second end of said extension cord;
   a second connector mounted to an external surface of said housing and electrically connected to said plurality of electrical power conductors at the first end of said extension cord; and
   a third connector mounted in a second opening of said housing and electrically connected to said plurality of data transmission conductors at the first end of said extension cord.

8. The extension cord of claim 7, further comprising:
   a rewinder attached to said spool mechanism.

9. The extension cord of claim 8, wherein said rewinder is a manual operator having a pivotally mounted handle.

10. The extension cord of claim 8, wherein said rewinder comprises a spring.

11. The extension cord of claim 8, further comprising:
    a lock button extending through a surface of said housing toward a hub of said spool mechanism.

12. The extension cord of claim 8, wherein said second connector comprises a plurality of pivotally mounted prongs.

13. A retractable extension cord comprising:
    a housing;
    a spool mechanism rotatably mounted within said housing;
    a flat extension cord having a first end attached to said spool mechanism and a second end extending from a first opening in said housing, said extension cord comprising an elongate dielectric strip, a plurality of flexible electrical power conductors extending lengthwise within said strip, a plurality of flexible data transmission conductors electrically insulated from said electrical power conductors and extending lengthwise within said strip, and a first connector electrically connected to said plurality of electrical power conductors and said plurality of data transmission conductors at a second end of said extension cord;
    a second connector pivotally mounted to an external surface of said housing and electrically connected to said plurality of electrical power conductors at the first end of said extension cord;
    a third connector mounted in a second opening of said housing and electrically connected to said plurality of data transmission conductors at the first end of said extension cord; and
    a circuit protection device electrically connected between said second connector and at least one of said plurality of electrical power conductors.

14. The extension cord of claim 13, further comprising:
    a rewinder attached to said spool mechanism.

15. The extension cord of claim 14, wherein said rewinder is a manual operator having a pivotally mounted handle.

16. The extension cord of claim 14, wherein said rewinder comprises a spring.

17. The extension cord of claim 13, further comprising:
    a lock button extending through a surface of said housing toward a hub of said spool mechanism.

18. The extension cord of claim 13, wherein said second connector comprises a plurality of pivotally mounted prongs.

19. The extension cord of claim 13, further comprising:
a bracket pivotally mounted to at least one external surface of said housing, said second connector being attached to said bracket.

20. The extension cord of claim 19, wherein said bracket comprises a transformer.

21. A housing for a retractable extension cord comprising:
a hollow casing having a removable cover plate and a first opening through which said retractable extension cord extends;
a spool rotatably mounted within said housing;
a rewinder attached to said spool;
a bracket pivotally mounted to at least one external surface of said hollow casing, said bracket having a multi-prong electric plug attached thereto;
a second opening in said hollow casing so dimensioned as to receive electrical conductors extending from said multi-prong plug into said hollow casing;
a third opening in said hollow casing so dimensioned as to receive a telephone line connector; and
a button attached to an external surface of said hollow casing and extending longitudinally toward a hub of said spool, wherein depressing said button toward said hub substantially inhibits said spool from rotating.

22. The housing of claim 21, wherein said rewinder comprises an axle mechanism extending through an opening in said cover plate, said axle mechanism being attached at one end thereof to said hub of said spool and having a handle pivotally mounted to the opposite end thereof.

23. The housing of claim 21, wherein said rewinder comprises a coil spring having an inner attachment and an outer attachment, said inner attachment being attached to a central portion of said spool and said outer attachment being attached to an inner surface of said casing.

24. The housing of claim 21, wherein said bracket comprises a transformer.

25. A retractable extension cord comprising:
a hollow housing;
a spool mechanism rotatably mounted within said housing;
a rewinder attached to said spool mechanism;
a flat extension cord having a first end attached to said spool mechanism and a second end extending from a first opening in said housing, said extension cord comprising:
an elongate dielectric strip, a plurality of flexible electrical power conductors extending lengthwise within said strip, a plurality of flexible data transmission conductors electrically insulated from said electrical power conductors and extending lengthwise within said strip, and a first connector electrically connected to said plurality of electrical power conductors and said plurality of data transmission conductors at a second end of said extension cord;
a circuit protection mechanism mounted within said housing and electrically connected to at least one of said plurality of electrical power conductors at the first end of said extension cord;
a multi-prong plug rotatably mounted to an external surface of said housing and electrically connected to said circuit protection mechanism and at least one of said plurality of power conductors at the first end of said extension cord;
a female telephone jack mounted in a second opening of said housing and electrically connected to said plurality of data transmission conductors at the first end of said extension cord.

26. The retractable extension cord of claim 25, wherein the prongs of said multi-prong plug are pivotally mounted.

27. A retractable extension cord comprising:
a hollow housing
a spool mechanism rotatably mounted within said housing;
a rewind mechanism coupled to said spool mechanism;
a flat extension cord having a first end attached to said hub and a second end extending from a first opening in said housing, said extension cord comprising:
an elongate dielectric strip, a plurality of flexible electrical power conductors extending lengthwise within said strip, a plurality of flexible data transmission conductors electrically insulated from said electrical power conductors and extending lengthwise within said strip, and a first connector electrically connected to said plurality of electrical power conductors and said plurality of data transmission conductors at a second end of said extension cord;
a bracket rotatably mounted to an external surface of said housing;
a multi-prong plug mounted to an external surface of said bracket and electrically connected to said plurality of electrical power conductors;
a female telephone jack mounted in a second opening of said housing and electrically connected to said plurality of data transmission conductors at the first end of said extension cord.

28. The extension cord of claim 27, wherein said rewinder comprises an axle mechanism extending through an opening in said housing, said axle mechanism being attached at one end thereof to a hub of said spool mechanism and having a handle pivotally mounted to the opposite end.

29. The extension cord of claim 27, wherein said rewinder comprises a coil spring having an inner attachment and an outer attachment, said inner attachment being attached to a central portion of said spool and said outer attachment being attached to an inner surface of said housing.

30. The extension cord of claim 27, wherein said bracket comprises a transformer, said transformer a primary electrically connected to said multi-prong plug, and a secondary electrically connected to said plurality of electrical power conductors at the first end of said extension cord.

31. A retractable extension cord comprising:
a hollow casing having a removable cover plate and a first opening through which said retractable extension cord extends;
a reel rotatably mounted within said hollow casing;
a rewinder attached to said reel;
a flat extension cord having a first end attached to said hub and a second end extending from a first opening in said hollow casing, said extension cord comprising:
an elongate dielectric strip, a plurality of flexible electrical power conductors extending lengthwise within said strip, a plurality of flexible data transmission conductors electrically insulated from said electrical power conductors and extending lengthwise within said strip, and a first connector electrically connected to said plurality of electrical power conductors and said plurality of data transmission conductors at a second end of said extension cord;
a circuit protection mechanism mounted within said hollow casing and electrically connected to at least one of said plurality of electrical power conductors at the first end of said extension cord;

a bracket rotatably mounted to at least one external surface of said hollow casing;

a multi-prong plug mounted to an external surface of said bracket and electrically connected to said plurality of electrical power conductors at the first end of said extension cord, the prongs of said multi-prong plug being pivotally mounted thereto;

a female data transmission connector mounted in a second opening of said hollow casing and electrically connected to said plurality of data transmission conductors at the first end of said extension cord; and a button mounted in a third opening of said hollow casing and extending longitudinally toward a hub of said reel, wherein depressing said button toward said hub substantially inhibits said reel from rotating.

32. The extension cord of claim 31, wherein said rewinder comprises an axle mechanism extending through an opening in said cover plate, said axle mechanism being attached at one end thereof to a hub of said reel and having a handle pivotally mounted to the opposite end thereof.

33. The extension cord of claim 31, wherein said rewinder comprises a coil spring having an inner attachment and an outer attachment, said inner attachment being attached to a central portion of said reel and said outer attachment being attached to an inner surface of said casing.

34. The extension cord of claim 31, wherein said bracket comprises a transformer, said transformer having a primary electrically connected to said multi-prong plug, and a secondary electrically connected to said circuit protection mechanism and to at least one of said plurality of electrical power conductors at the first end of said extension cord.

* * * * *